UNITED STATES PATENT OFFICE.

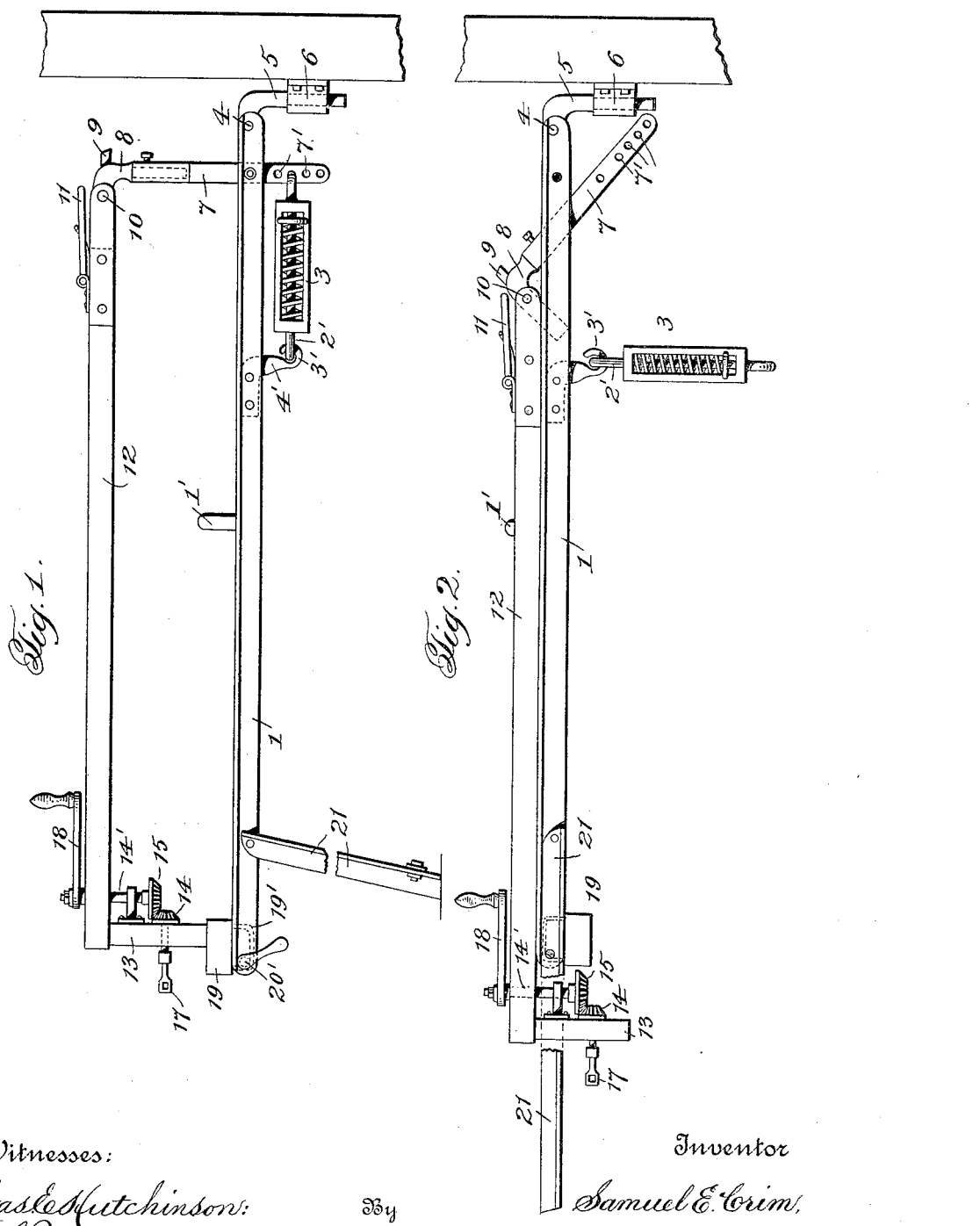

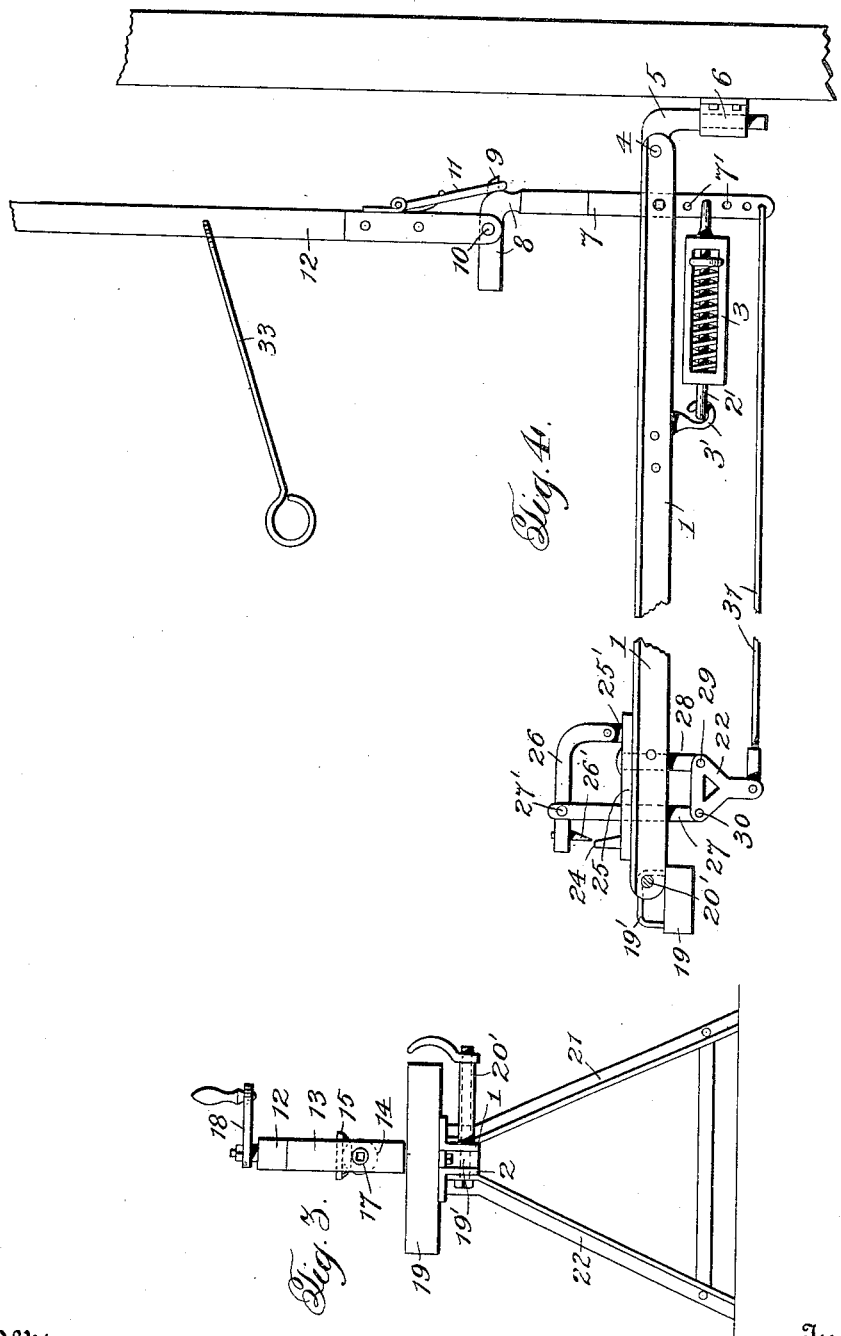

SAMUEL E. CRIM, OF MECHANICSBURG, OHIO, ASSIGNOR OF ONE-HALF TO W. B. CRIM, OF MECHANICSBURG, OHIO.

TIRE-BOLTING MACHINE.

1,131,476. Specification of Letters Patent. Patented Mar. 9, 1915.

Application filed August 11, 1913. Serial No. 784,279.

*To all whom it may concern:*

Be it known that I, SAMUEL E. CRIM, citizen of the United States, residing at Mechanicsburg, in the county of Champaign and State of Ohio, have invented certain new and useful Improvements in Tire-Bolting Machines, of which the following is a specification, reference being had therein to the accompanying drawing.

The invention has for its object to provide a tire bolting and cutting machine which will remove or apply the nuts from the bolts that secure the metal tire to the felly of the wheel very rapidly, and also clip off any part of the bolt projecting above the head of the tap, the operation of the machine being very simple and adapted to be operated by a single person.

A further object of my invention is to provide a machine that is light in weight, yet very strong and durable and can be folded and locked in folded position so that the same will not occupy much space when the machine is not being used.

A still further object of my invention is to provide a machine that is so constructed that the operator can work on the body portion of the wheel when desired.

With these objects in view, the invention consists in certain novel and important features of construction as hereinafter described, and in order that a full knowledge of the construction may be obtained, reference is to be had to the accompanying drawing forming part of this application.

In the drawings: Figure 1 is a side elevation; Fig. 2 is a side elevation in folded position; Fig. 3 is an end view; and Fig. 4 is a side elevation, parts broken away and illustrating the cutting mechanism.

Referring more particularly to the drawings, wherein corresponding numerals indicate like parts, 1 and 2 represent angle irons forming the bed of the machine. These angle irons are oppositely arranged, thereby forming a substantially flat table on their upper faces. The inner walls of the angle irons 1 and 2 are spaced from and arranged parallel to each other, the space between the irons being adapted to receive the hub supporting spindle 1' which can be adjusted to accommodate different sized wheels. At the rear end the angle irons are pivotally attached to a supporting spindle 5 by a bolt 4, the said supporting spindle being flattened at the pivotal connection point to form a spacing means for the angle irons. The shank of the supporting spindle is round and positioned within a collar 6, so that the tire machine can be given a horizontal movement when necessary.

Suitably pivoted to the angle irons 1 and 2 at their forward ends are the foldable legs 21 and 22. These legs are also preferably angular in shape. Pivotally secured to the angle irons and extending at right angles thereto is an arm member 7, the lower end of which is provided with a series of apertures 7' and at its upper end socketed to receive an adjustable L-shaped supporting member 8, the said member 8 being provided with an outstanding lug 9, the purpose of which will be hereinafter described.

Pivotally attached to the telescopic adjustable section 8 by the pin 10 is an arm 12, the said arm being parallel with the angle irons 1 and 2, and at its forward end provided with a downward extension 13. Rotatably secured to the downward extension 13 is a bevel gear 14 adapted to mesh with a gear 15, the said gear 14 carrying a tool chuck adapted to receive a wrench. Suitably attached to the gear 15 is a shaft 14' adapted to be rotated by an operating handle 18. The end of the downward extension 13 rests on a movable block 19 to form a solid bearing for the said downward extension. Attached to the angle irons 1 and 2 between their parallel faces, and depending therefrom is an L-shaped supporting member 4', the lower end of which is provided with an eye 3'. A spring member 3 provided with a hook portion 2' adapted to engage the eye of the L-shaped member, is positioned below the supporting member and at its opposite end pivotally connected to the lower end of the member 7 by a hook engagement with one of the apertures 7'. The purpose of this spring will be described later. Another object of the block 19 is that when it is desired to fold the machine to store the same away, the spring 3 is uncoupled from the arm 7 and the member 12, carrying the extension 13 and bevel gears is swung forward. The block 19 being mounted by a link 19' on a bar 20' is turned to the underside of the angle irons 1 and 2 as far as possible and the frame 12 is then moved down to rest on the angle irons. When the frame 12 is in this position, the block 19 is moved forward slightly to engage the upper face of the bevel gear 14', thereby locking the machine in folded position. The legs 21 and 22 are then swung upward on both sides of the extension 13.

The operation of my invention as thus far described is as follows: When it is desired to apply or remove the nuts as occasion may be, the member 12 is elevated upward and a wheel placed on the spindle 1'. When the wheel is in this position the frame 12 is lowered. The operator then grasps the rotatable lever 18 and through the gears 14 and 15 imparts a rotary motion to the wrench 17. The member 12 is then again raised and another nut adapted to be tightened is moved into position, the operation being repeated until all the nuts have been tightened or removed, as desired. When it is necessary to operate on the central portion of the wheel, the member 12 and its parts are raised to a vertical position and held in that position by the spring clip 11, carried by the arm 12 and adapted to be moved into engagement with the lug 9 on the L-shaped supporting member, the spring member 3, exerting sufficient tension on the arm 7 to counterbalance the weight of the members 7 and its parts. Very often in applying taps to bolts, the bolts are too long and protrude above the head of the tap. Applicant's invention comprises means for severing the protruding parts. This is done by swinging the block 19 to the underside of the irons 1 and 2, and positioning an anvil block 25 on the angle irons 1 and 2, the said block 25 carrying an anvil 24 at one end and at its other end having an upstanding lug 25' to which a substantially L shaped arm 26 is pivoted, the said arm 26 at its lower end carrying a chisel 26'. Pivotally attached to the arm 26 by a removable pin 27' and extending downwardly therefrom is an arm 27, the said arm at its lower end being pivoted to a substantially Y-shaped lever 22 by a cross pin 30. The block 25 has permanently attached thereto and extending downwardly therefrom an arm 28 to which is pivotally connected the opposite end of the lever 22, this connection being made by a removable pin 29. When it is desired to operate the cutter, the arm 12 is moved upward to a position substantially parallel with the arm 7 and is held in this raised position by a spring locking latch 11, carried by the arm 12 and which engages an outstanding lug 9 on the telescopic member 8, and holds the arm 12 with its parts in operative position, the spring 3 counterbalancing the said outstanding arm 7 and its parts. The member 12 has preferably attached thereto a pull rod 33. Pivotally attached to the lower end of the arm 7 is a rod 31, the said rod extending parallel with the angle irons 1 and 2, and at its opposite end attached to the free end of the Y-shaped lever 22. It will be seen that a pull on the pull rod 33 will cause the rod 31 to move forward, causing a downward movement on the arm 27, the said arm 27 operating the chisel carrying arm 26, which engages the anvil 24 and clips off any protruding part of the bolt.

From the above description, it will be apparent that I have produced a wheel tire bolting and cutting mechanism comprising the features of advantage enumerated, as desirable, and I wish it to be understood that I reserve the right to make all changes in the form, proportion, detail construction and arrangement of parts properly falling within the spirit and scope of the appended claims.

I claim:—

1. In a tire bolting machine, the combination of a horizontally disposed support having means for supporting a wheel thereon, an arm secured to said support with a carrying frame positioned above the support and pivoted to said upright, and operating mechanism carried by the frame, said carrying frame extending longitudinally above the support and pivoted so as to swing vertically to bring the operative mechanism into and out of operative position relative to the wheel.

2. In a tire bolting machine, the combination of a horizontally disposed support having means for supporting a wheel thereon, an upright secured to said support, with a carrying frame positioned above the support and pivoted at one end to said upright, and operating mechanism carried by the frame, said carrying frame extending longitudinally above the support and pivoted so as to swing vertically to bring the operative mechanism into and out of operative position relative to the wheel, and means for holding the frame in an elevated position.

3. In a tire bolting machine, the combination of a horizontally disposed support having means for supporting a wheel thereon, with an arm secured to said support, a carrying frame secured to said arm, nut operating mechanism carried by said carrying frame, of means for holding the carrying frame in raised position, and tension means for counterbalancing the said carrying frame and upright.

4. In a tire bolting machine the combination of a horizontally disposed support having means for supporting a wheel thereon, with a spring member suspended from said support, an arm secured to said support, a carrying frame pivoted to said upright, nut operating mechanism carried by the said carrying frame, means for holding the carrying frame in raised position, the lower end of the arm connected to the spring member, and said spring member counterbalancing said carrying frame and upright.

5. In a tire bolting machine, the combination of an elongated disposed support, having means for supporting a wheel thereon, with an elongated frame extending longitudinally over said support, operating mechanism carried by said frame, said elongated frame being movable into and out of position relative to the periphery of the wheel and tension means for holding the said frame in raised position.

6. In a tire bolting machine, the combination of an elongated support and means for supporting a wheel thereon, an elongated frame positioned above the support, operating mechanism carried by the frame, the said frame being movable into and out of operative position relative to the periphery of the wheel, and tension means for holding the same in raised position.

7. In a tire bolting machine, the combination of a suitable support having means for supporting a wheel thereon, with a carrying frame extending over the support, operating mechanism carried by the said frame, the said frame being pivoted to swing vertically into and out of operative position relative to the periphery of the wheel.

8. In a tire bolting machine, the combination of a suitable support and means for supporting a wheel thereon, with a carrying frame extending over said support, operating mechanism carried by the said frame, the said frame being movable into and out of position relative to the periphery of the wheel, and means for holding the said frame in raised position.

In testimony whereof I affix my signature in presence of two witnesses.

SAMUEL E. CRIM.

Witnesses:
CHAS. A. WOOD,
C. C. SLATER.

Copies of this patent may be obtained for five cents each, by addressing the "Commissioner of Patents, Washington, D. C."